United States Patent [19]

Kohlheb

[11] 4,040,965

[45] Aug. 9, 1977

[54] ROTARY FILTER SEPARATOR

[75] Inventor: Robert Kohlheb, Bovenden, Germany

[73] Assignee: Firma Supraton Aurer & Zucker OHG, Neuss, Germany

[21] Appl. No.: 703,029

[22] Filed: July 6, 1976

[30] Foreign Application Priority Data

July 3, 1975 Germany .......................... 2529614

[51] Int. Cl.² ........................................... B01D 31/00
[52] U.S. Cl. ................................... 210/297; 210/315; 210/433 M
[58] Field of Search ............... 210/23 H, 321 R, 297, 210/315, 330, 360 A, 433 M

[56] References Cited

U.S. PATENT DOCUMENTS

| 3,400,074 | 9/1968 | Grenci | 210/23 H |
| 3,669,879 | 6/1972 | Berriman | 210/23 H |

Primary Examiner—Frank A. Spear, Jr.
Attorney, Agent, or Firm—John C. Smith, Jr.

[57] ABSTRACT

A rotary filter separator for continuous filtration comprises a cylindrical filter element including a membrane housed within a cylindrical drum. A solution such as a colloidal solution is passed upwardly between the interior surface of the drum and the exterior surface of the membrane. The filtrate or permeate is continuously drawn off from the interior of the cylindrical filter element while the concentrate is continuously drawn off from the space between the drum and membrane.

7 Claims, 1 Drawing Figure

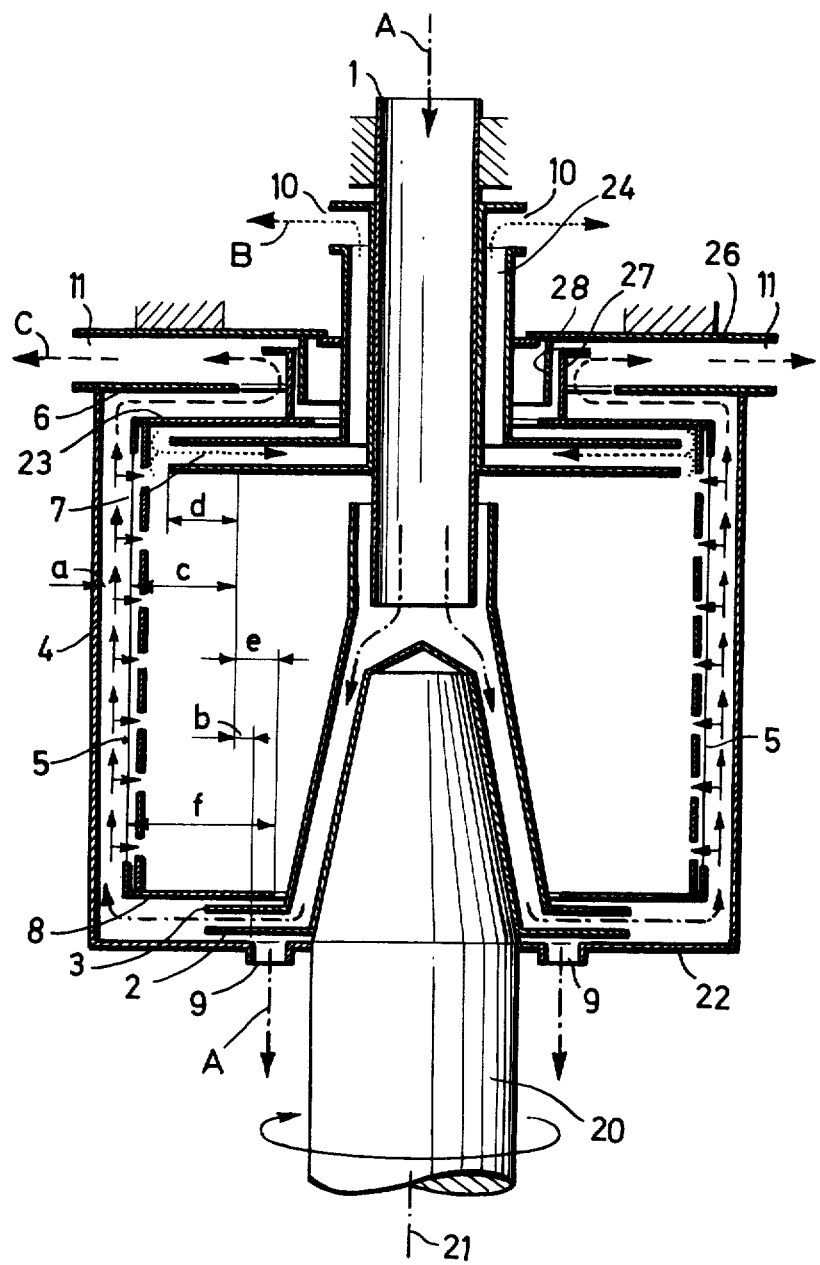

ROTARY FILTER SEPARATOR

This invention is concerned with a method and apparatus for filtration and more particularly a method and apparatus for filtering a solution through a membrane with the aid of centrifugal force.

Sensitive filter membrane surfaces can be severely damaged by the solid impurities present in some colloidal solutions. Also, there is polarization of the solution as it becomes increasingly concentrated during filtration which decreases the membrane efficiency sometimes to the point that no further filtering action takes place. This necessitates cleaning, back-flushing and possibly changing the membrane. Consequently, the filtering process is not continuous and is therefore not as efficient as would be desired.

An object of the present invention is increased filtration of ultra-filtration efficiency of suspensions, solutions, e.g. colloidal solutions, etc.

A further object of the present invention is to provide apparatus whereby filtration of suspensions, solutions, e.g. colloidal solutions, etc. may be carried out continuously without cleaning, back-flushing and exchange of filter elements.

Briefly, in accordance with the present invention solutions such as colloidal solutions are concentrated in the centrifugal field of a rotary separator. The increasingly concentrated solution (concentrate) is continuously fed away from the filter surface and replaced by lower density solution, thus avoiding clogging of the filter surfaces. The result is improved filtering efficiency compared with prior art processes.

The invention will be described in detail with reference to the accompanying drawing which is a diagrammatic sectional view of filtration apparatus according to the present invention.

A cylindrical drum 4 is mounted for rotation on a shaft 20 about a fixed axis 21. The lower end of the drum 4 is closed by an annular member 22 having a plurality of openings 9 therein at a predetermined radial distance from the axis 21. The upper end of the drum is partially closed by an annular plate 6 having an axially disposed opening therein of predetermined radial distance.

Mounted within the drum is a cylindrical filter element or membrane 5. The upper and lower ends of the filter element 5 are partially closed by annular baffles 23 and 8, respectively, having axially disposed openings therein of predetermined radial distance. Thus, a passage is provided which is defined by annular member 22 and lower annular baffle 8, the interior surface of the drum 4 and the exterior surface of the filter element 5, and the annular plate 6 and annular baffle 23.

A stationary tube 1 passes through the openings in annular plate 5 and annular baffle 23 terminating a spaced distance from the end of shaft 20. A conical plate 3 extends downwardly from a position adjacent the end of the tube 1 a spaced distance from the shaft 20 provides a conical passage downwardly about the shaft 20 and radially into the passage between the annular member 22 and annular baffle 8. Plate 2 extends radially from the shaft 20 to define a radial extension of the conical passage. A passage 25 extends radially towards the interior surface of the filter element 5 adjacent the upper end thereof and has an annular inlet 7 at a predetermined radial distance from the axis. An annular member 26 combined with cylindrical members 27 and 28 provides a passage 11 which is a continuation of the passage between annular plate 6 and annular baffle 23.

While filter separator is being rotated, a colloidal solution A is passed downwardly through tube 1 into the separator. The solution passes about the shaft 20 and is introduced between plates 2 and 3 into the passage $a$ between the drum 4 and the filter element 5. The solution A then passes upwardly through passages $a$ either in axial direction or possibly along a spiral path.

During contact between solution A and the filter element or membrane 5, continuous concentration and separation takes place. The low molecular weight phase determined by the mesh size or porosity of the membrane passes through the membrane as a filter or permeate B to the interior of the filter element. The filtering action is maintained due to the pressure differential occuring between the layer of solution A, the concentrate C and the filtrate or permeate B, all located in the centrifugal field. The filtration or membrane filtration pressure differential is:

$$\Delta P \max = \rho C \cdot \omega^2 \frac{R^2 - (R - \Delta rc)^2}{2} -$$

$$\rho B \cdot \omega^2 \frac{R^2 - [R - (\Delta rc - \Delta rd)]^2}{2}$$

$\Delta rc$ is the radial direction dimension the layer thickness $c$ of its density in kg/m$^3$;

$\rho C$ is its density in kg/m$^3$;

$\Delta rc$-$\Delta rd$ is the difference in the radial directional dimension of the layer thicknesses $c$-$d$ of the permeate $B$ in $m$;

$\rho B$ however is density in kg/m$^3$, $\omega$ is the circular frequency of the rotational field in $s^{-1}$;

$R$ is the radius of the filter, especially a membrane filter jacket, from the rotary axis in $m$.

This filtration pressure differential is variable. It will depend upon pressure in the annular inlet 7 which is a low pressure area through which the filtrate or permeate B passes from the interior of the filter element. The flow rate of the filtrate or permeate may be controlled through passage 10. The concentrate C flows from passage $a$ through passage 11. The solid content of the concentrate C may be adjusted, if necessary, by means of partial recirculation, though the continuity of the process must be retained. The excess radial dimension $e$ of the lower cut-off limit or baffle 8 prevents the suspension, solution of collodial solution A from being mixed with the permeate B: $e$ $b$. The thickness of the solution A may not be higher than the sum of the dimensions $a + b + c$, since otherwise the rotating openings, uniformly spaced apart, would overrun. Any back-flushing of the filter elements or membranes can be carried out before turning off the apparatus by means of the pressure determined by the radial dimension $f$, corresponding to the maxium radial thickness of the flushing liquid. After the apparatus is turned off, the concentrate C, the permeate B, and the solution A automatically flow out through openings 9 in annular member 22.

The filter element may be of the ultra-filtration or hyper-filtration type. Also, in place of a single cylindrical membrane there may be a plurality of cylindrical membranes of the same diameter arranged axially in series or the cylindrical membranes may be of different diameters arranged concentrically so that the filtration occurs in stages.

As another alternative construction, the drum and filter element may be both conical in construction.

The ratio of the revolutions per minute of the membrane filter and rotary drum is preferably one, but in any event it must be at least equal to zero.

The plane section normal to the rotary axis of the rotating membrane surface or surfaces may have the configuration of the lines of a circle or several concentric circles or the curves of one or more spirals radiating from a central point as for example a parabolic spiral.

The rotary filter separator of the present invention may be utilized for the separation of organic and inorganic systems such as suspensions, collodial solutions or other solutions into their component parts. The separator may be used to concentrate and fractionate according to molecular weights. It may be used for the separation of mud, the cleaning of waste water, the production of liquid concentrates of botanical origin, and firmentation substrates, the extraction of biotechnological products, medicines and enzymes and the recovery of color pigments.

As stated earlier, an advantage of the present invention as described is that with the aid of the centrifugal field, a continuous process with improved efficiency can be achieved. Membrane filtration which previously was unreliable can now be carried out efficiently. No pre-filtration of the suspensions, solutions or colloidal solutions is necessary as was formerly the case. The small solid impurities which normally concentrate during filtration are carried away externally from the filter or membrane.

A further advantage of the separator described above is that the increasingly concentrated liquid in the rotary field insures a constantly free filtration surface for the less concentrated liquid.

It is to be understood that while a specific embodiment of the present invention has been illustrated and described the invention is not to be limited to these specific forms or arrangememt of parts hereindescribed and shown.

We claim:

1. A rotary filter separator for continuous filtration comprising:
   a. a cylindrical drum of predetermined diameter and length and mounted for rotation about a substantially vertical axis, said drum having means closing the lower end of said drum and including at least one port therein at a predetermined first radial distance from said axis and first annular means partially closing the upper end of said drum and defining an axially disposed first opening of predetermined second radial distance longer than said first radial distance,
   b. a cylindrical filter element of smaller diameter and length than said drum axially mounted interiorally of said drum, said filter element having second annular means partially closing lower end of said filter element and third annular means partially closing the upper end of said filter element, said second and third annular means defining second and third axially disposed openings respectively, said third opening having a predetermined third radial distance shorter than said first radial distance, whereby a first passage is defined between said closure means at the lower end of said drum and said second annular closure means, between the interior surface of said drum and the exterior surface of said filter element, and between said first and third annular closure means;
   c. means defining a second passage within said filter element extending radially toward the interior surface of said filter element adjacent the upper end thereof, said second passage having an annular inlet spaced from the interior surface of said filter element a predetermined fourth radial distance which is greater than said first, second and third radial distances, and
   d. means for feeding a solution to be filtered into said first passage between said closure means at the lower end of said drum and second annular closure means
   e. whereby the solution is continuously filtered through said cylindrical element, the filtrate is conducted from said separator through said second passage and the concentrate is conducted from said first passage between said first and third annular closure means.

2. A separator according to claim 1 wherein said filter element comprises an ultra- or hyper-filtration membrane.

3. A separator according to claim 1 wherein said filter element comprises a plurality of cylindrical membranes of substantially the same diameter arranged axially in series, said membranes having different cut-off limits or baffles.

4. A separator according to claim 1 wherein said filter element comprises a plurality of cylindrical membranes positioned concentrically, said membranes having different cut-off limits or baffles.

5. A separator according to claim 1 wherein said drum and filter element have a conical configuration.

6. A separator according to claim 1 in which the r.p.m. ratio of th membrane filter and the rotary drum is at least zero.

7. A separator according to claim 6 in which the r.p.m. ratio of the membrane filter and rotary drum is 1.

* * * * *